Patented Nov. 11, 1924.

1,515,325

UNITED STATES PATENT OFFICE.

GEORGE C. BAILEY, OF WOODCLIFF-ON-HUDSON, NEW JERSEY, ASSIGNOR TO THE BARRETT COMPANY, A CORPORATION OF NEW JERSEY.

PROCESS OF PRODUCING ANTHRAQUINONE.

No Drawing. Application filed February 8, 1921. Serial No. 443,433.

*To all whom it may concern:*

Be it known that I, GEORGE C. BAILEY, a citizen of the United States, residing at Woodcliff-on-Hudson, in the county of Hudson and State of New Jersey, have invented certain new and useful Improvements in Processes of Producing Anthaquinone, of which the following is a specification.

This invention relates to improvements in the usual method of producing anthraquinone from benzoyl-benzoic acid and also the derivatives of anthraquinone from the corresponding derivatives of benzoyl-benzoic acid.

Since the supply of anthracene available in coal tar is limited and the demand for anthraquinone is considerable, the production of anthraquinone from other sources than by the oxidation of anthracene is very desirable. Similarly 2-methyl-anthraquinone necessary for certain vat dyes is required to be made synthetically, as there is little methyl-anthracene available in coal tar. It is possible to synthesize anthraquinone from phthalic acid anhydride and benzene by a modification of the Friedel and Crafts reaction using anhydrous aluminum chloride. In this reaction there is formed first benzoyl-benzoic acid which is condensed by the use of sulfuric acid into anthraquinone. In a similar way derivatives of benzoyl-benzoic acid may be made. For example, from toluene and phthalic acid anhydride tolyl-benzoic acid is formed; from phthalic acid anhydride and chlorobenzene chlorobenzoyl-benzoic acid, and from these derivatives of benzoyl-benzoic acid the corresponding derivatives of anthraquinone are formed. The condensation of the phthalic acid anhydride and the hydrocarbon is a fairly simple process, but unless special precautions are taken the condensation of the benzoyl-benzoic acid or derivatives to obtain anthraquinone or derivatives is very troublesome.

For example, in the preparation of 2-methyl-anthraquinone, phthalic acid anhydride and toluene are condensed with aluminum chloride and the tolyl-benzoic acid obtained. This dried acid is then heated with strong sulfuric acid or oleum at elevated temperatures for several hours in order to form the 2-methyl-anthraquinone. In order to obtain the methyl-anthraquinone it is necessary to dilute the sulfuric acid to precipitate the compound, for it is soluble in the strong sulfuric acid and very insoluble in the weak sulfuric acid. However, if this dilution is not carried out properly the 2-methyl-anthraquinone separates in such form that filtration is almost impossible. Such a result will happen if the acid mixture is allowed to cool and is then poured into cold water.

One of the objects of this invention is to overcome the difficulty above referred to. I have found that if the mixture containing the hot sulfuric acid be poured into hot water as rapidly as convenient, without allowing the mass to boil over, and the mixture be agitated for a few minutes, the methyl-anthraquinone will separate in such well defined form that it is readily filtered. The agitation of the mixture may be accomplished by blowing steam into the tank which contains the water. The dilution water may be heated in this way if desired, and the blowing of steam continued during the introduction of the hot sulfuric acid solution, although this is not necessary to secure the methyl-anthraquinone in well defined crystals, as other methods for agitation and for heating the water may be used.

The same process may be applied to the preparation of anthraquinone or beta-chloranthraquinone and other derivatives from the corresponding benzoyl-benzoic acid or its derivatives.

That is, other compounds of the anthraquinone type, such as anthraquinone or its derivatives, may be produced in the same way as above described for the production of methyl-anthraquinone by treating the corresponding benzoyl-benzoic acid. In the specification and claims the terms "anthraquinone" and "benzoyl-benzoic acid" are to be understood in this broad or generic sense to include the substances and their derivatives or substitution products.

I claim:

1. That step in the production of a compound of the anthraquinone type which comprises treating the corresponding benzoyl-benzoic acid with strong sulfuric acid at an elevated temperature and introducing the products into hot water.

2. That step in the production of a compound of the anthraquinone type which comprises treating the corresponding benzoyl-benzoic acid with strong sulfuric acid at an elevated temperature and introducing the products while hot into hot water.

3. That step in the production of a compound of the anthraquinone type which comprises treating the corresponding benzoyl-benzoic acid with strong sulfuric acid at an elevated temperature and introducing the products into hot water and agitating.

4. That step in the production of a compound of the anthraquinone type which comprises treating the corresponding benzoyl-benzoic acid with strong sulfuric acid at an elevated temperature and introducing the products into hot water while blowing steam into the water.

5. That step in the production of a compound of the anthraquinone type which comprises treating the corresponding benzoyl-benzoic acid with strong sulfuric acid at an elevated temperature and diluting with hot water.

In testimony whereof I affix my signature.

GEORGE C. BAILEY.